(12) United States Patent
McClure

(10) Patent No.: US 11,639,734 B2
(45) Date of Patent: *May 2, 2023

(54) ONE PIECE SCREWS FOR, AND METHODS FOR MAKING AND USING, BLIND SIDE FASTENERS AND SYSTEMS WITH FREE SPIN FEATURE

(71) Applicant: Centrix Inc., Kent, WA (US)

(72) Inventor: Travis McClure, Kirkland, WA (US)

(73) Assignee: Centrix Inc., Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,493

(22) Filed: Feb. 9, 2022

(65) Prior Publication Data

US 2022/0268305 A1 Aug. 25, 2022

Related U.S. Application Data

(63) Continuation of application No. 17/068,468, filed on Oct. 12, 2020, which is a continuation of application No. 16/232,892, filed on Dec. 26, 2018, now Pat. No. 10,830,269, which is a continuation of application No. 15/113,627, filed as application No. PCT/US2015/016457 on Feb. 18, 2015, now Pat. No. 10,190,615.

(60) Provisional application No. 61/941,475, filed on Feb. 18, 2014.

(51) Int. Cl.
| | | |
|---|---|---|
| *F16B 19/10* | (2006.01) | |
| *F16B 13/04* | (2006.01) | |
| *F16B 37/08* | (2006.01) | |

(52) U.S. Cl.
CPC .......... *F16B 19/109* (2013.01); *F16B 13/045* (2013.01); *F16B 37/085* (2013.01)

(58) Field of Classification Search
CPC ..... F16B 19/109; F16B 13/045; F16B 37/085
USPC ........................................................ 411/55
See application file for complete search history.

(56) References Cited

U.S. PATENT DOCUMENTS

| | | |
|---|---|---|
| 1,487,682 A | 3/1924 | Leppert |
| 1,978,935 A | 10/1934 | Douglas |
| 2,241,609 A | 5/1941 | McClelland et al. |
| 2,370,336 A | 2/1945 | Wallace |

(Continued)

FOREIGN PATENT DOCUMENTS

| | | |
|---|---|---|
| CN | 103562473 A | 2/2014 |
| EP | 0275160 A2 | 7/1988 |

(Continued)

OTHER PUBLICATIONS

KWIKBOLT Alleged Purchase Order Issued to Wesco Aircraft Europe Ltd., Allegedly Dated Jan. 24, 2012, Supplied by a 3rd Party, 2 pages.

(Continued)

*Primary Examiner* — Flemming Saether
(74) *Attorney, Agent, or Firm* — McCoy Russell LLP

(57) ABSTRACT

Fastener embodiments of the invention comprise a freely translatable collet body, which at least partially translates within an auxiliary structure, and further comprise a captive threaded screw for rotationally engaging with the collet body to transform rotational movement into translational movement through substantial arresting of collet body rotation by way of an anti-rotation means. The screw comprises a free-spin feature that functionally, but not physically, decouples a drive tool from the collet body.

20 Claims, 4 Drawing Sheets

(56) References Cited

U.S. PATENT DOCUMENTS

| | | | |
|---|---|---|---|
| 2,379,786 | A | 7/1945 | Bugg et al. |
| 2,649,884 | A | 8/1953 | Westover |
| 2,775,155 | A | 12/1956 | Tompkins et al. |
| 2,831,520 | A | 4/1958 | Clarke |
| 2,936,015 | A | 5/1960 | Rapata |
| 2,994,242 | A | 8/1961 | Buff et al. |
| 3,469,493 | A | 9/1969 | Fisher |
| 4,548,533 | A | 10/1985 | Pratt |
| 4,553,889 | A | 11/1985 | Le Dantec et al. |
| 5,065,490 | A | 11/1991 | Wivagg et al. |
| 5,300,108 | A | 4/1994 | Rebell et al. |
| 5,704,752 | A | 1/1998 | Logerot |
| 5,803,589 | A | 9/1998 | Lee |
| 6,174,118 | B1 | 1/2001 | Rebers |
| 6,287,044 | B1 | 9/2001 | Huber |
| 6,896,460 | B2 | 5/2005 | Enomoto et al. |
| 7,993,085 | B2 | 8/2011 | McClure |
| 8,075,234 | B2 | 12/2011 | McClure |
| 8,517,650 | B2 | 8/2013 | Niklewicz et al. |
| 9,709,085 | B2 | 7/2017 | McClure |
| 2002/0144574 | A1 | 10/2002 | Avetisian et al. |
| 2007/0243037 | A1 | 10/2007 | Pratt |
| 2009/0191021 | A1 | 7/2009 | Smith et al. |
| 2013/0039716 | A1 | 2/2013 | McClure |
| 2016/0363146 | A1 | 12/2016 | Branyon, III et al. |
| 2019/0078600 | A1 | 5/2019 | McClure |

FOREIGN PATENT DOCUMENTS

| | | | |
|---|---|---|---|
| GB | 413403 | A | 7/1934 |
| GB | 624714 | A | 6/1949 |
| GB | 1548964 | A | 7/1979 |
| GB | 2347170 | A | 8/2000 |
| JP | H1151018 | A | 2/1999 |
| WO | 02101248 | A1 | 12/2002 |
| WO | 2010027439 | A2 | 3/2010 |

OTHER PUBLICATIONS

KWIKBOLT Alleged Single Sided Tack Fastener Product Sheet, Allegedly Available as Early as Mar. 2012, Annotated and Supplied by a 3rd Party, 1 page.

KWIKBOLT Alleged Invoice Issued to Wesco Aircraft Europe Limited, Allegedly Dated May 14, 2012, Supplied by a 3rd Party, 1 page.

ISA United States Patent and Trademark Office, International Search Report and Written Opinion Issued in Application No. PCT/US2015/016457, dated May 18, 2015, WIPO, 6 pages.

State Intellectual Property Office of the People's Republic of China, Office Action and Search Report Issued in Application No. 201580008969.6, dated Jun. 30, 2017, 13 pages. (Submitted with Partial Translation).

European Patent Office, Extended European Search Report Issued in Application No. 15755019.5, dated Sep. 22, 2017, Germany, 7 pages.

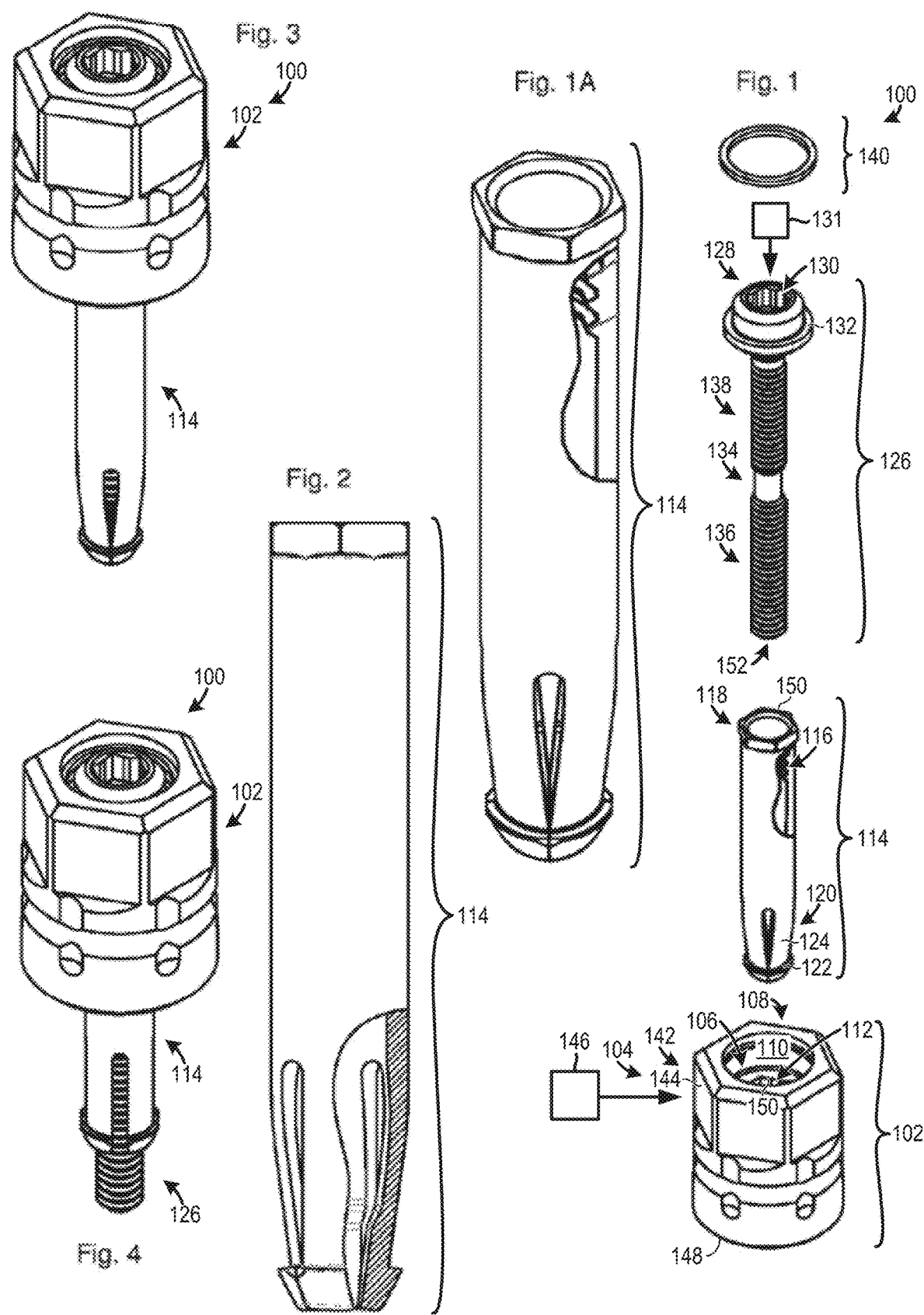

ONE PIECE SCREWS FOR, AND METHODS FOR MAKING AND USING, BLIND SIDE FASTENERS AND SYSTEMS WITH FREE SPIN FEATURE

CROSS-REFERENCE TO RELATED APPLICATIONS

The present application is a continuation of U.S. patent application Ser. No. 17/068,468 entitled "ONE PIECE SCREWS FOR, AND METHODS FOR MAKING AND USING, BLIND SIDE FASTENERS AND SYSTEMS WITH FREE SPIN FEATURE", and filed on Oct. 12, 2020. U.S. patent application Ser. No. 17/068,468 is a continuation of U.S. patent application Ser. No. 16/232,892 entitled "ONE PIECE SCREWS FOR, AND METHODS FOR MAKING AND USING, BLIND SIDE FASTENERS AND SYSTEMS WITH FREE SPIN FEATURE", and filed on Dec. 26, 2018. U.S. patent application Ser. No. 16/232,892 is a continuation of U.S. patent application Ser. No. 15/113,627 entitled "ONE PIECE SCREWS FOR, AND METHODS FOR MAKING AND USING, BLIND SIDE FASTENERS AND SYSTEMS WITH FREE SPIN FEATURE," and filed on Jul. 22, 2016. U.S. patent application Ser. No. 15/113,627 is a U.S. National Phase of International Application No. PCT/US2015/016457 entitled "ONE PIECE SCREWS FOR, AND METHODS FOR MAKING AND USING, BLIND SIDE FASTENERS AND SYSTEMS WITH FREE SPIN FEATURE," and filed on Feb. 18, 2015. International Application No. PCT/US2015/016457 claims priority to U.S. Provisional Application No. 61/941,475 entitled "ONE PIECE SCREWS FOR, AND METHODS FOR MAKING AND USING, BLIND SIDE FASTENERS AND SYSTEMS WITH FREE SPIN FEATURE," and filed on Feb. 18, 2014. The entire contents of each of the above-mentioned applications are hereby incorporated by reference in their entirety for all purposes.

SUMMARY

The present invention is directed to improved blind side fasteners and systems reliant upon rotationally constrained but freely translatable collet bodies disposed within auxiliary structures such as fastener housings, as well as methods for making and using such fasteners and systems comprising the same. Fastener embodiments of the invention comprise the aforementioned collet body, which at least partially translates within the aforementioned auxiliary structure, and further comprise a captive threaded screw for rotationally engaging with the collet body to transform rotational movement into translational movement through substantial arresting of collet body rotation by way of an anti-rotation means, as will be described below.

Fasteners according to the invention also comprise a free-spin feature or zone that functionally, but not physically, decouples a drive tool of a fastening system (e.g., an air tool) from the fastener. By so doing, when the drive tool is engaged with the fastener during a fastener removal operation, for example, continuous operation of the drive tool will neither permit undesired disassociation of the fastener components nor cause irreparable harm to the components thereof such as would be the case with hard stop bushing fasteners of the prior art.

Auxiliary structures according to the various invention embodiments each comprise one part of a two part anti-rotation means, which is found at or within a bore formed in such structure and is preferably characterized as (a) non-circular feature(s) (e.g., a planar surface, a slot or groove, a land, a key or protrusion, etc.). Each auxiliary structure has a proximal end and a distal end, wherein the distal end includes an exterior work piece contacting surface, whether integral there with or attachable there to, and preferably one part of a two part translation arresting means that is integral there with or attachable there to. Preferably, the orifice of the bore at the distal end is circular, although the cross sectional profile of the bore itself may be different and generally consistent throughout its axial run. And, while certain embodiments of the auxiliary structure have its outer surface characterized as substantially cylindrical and comprising a tool interface for countering potential induced rotation and thereby providing a mechanical ground for the anti-rotation means (for example, facets for receiving a wrench), such features are not necessary to the effective use of the various invention embodiments insofar as any means for countering potential induced rotation constitutes a viable arrangement. For convenience, but not as a restriction, the term "housing" and synonyms thereof will be used in lieu of the phrase "auxiliary structure".

Collet bodies according to the invention embodiments each comprise another part of the two part anti-rotation means, which is preferably is preferably characterized as (a) complementary non-circular feature(s) (e.g., a planar surface, a slot or groove, a land, a key or protrusion, etc.), and further comprise a distal end having radially displaceable fingers, each preferably having a work piece gripping element on an exterior surface thereof and a screw interface on an interior surface thereof. Each collet body additionally defines a central, axially aligned bore having an internal threaded portion, preferably at or adjacent to a proximal end. The exterior dimensions and surface geometry of these collet bodies are such that preferably all portions thereof but the anti-rotation means, which may be localized at the proximal end of the collet body, are translatably extendable past the housing distal end (preferably, proximally localized collet body anti-rotation means constitutes another part of the translation arresting means, and axially interferes with a portion of the housing, which as previously described constitutes another part of a translations arresting means).

The various invention embodiments further each comprise a screw having a threaded portion, a proximal end and a distal end, and which is threadably engageable with the collet body threaded portion. Additionally, these threaded screws are preferably associated with the housing, e.g., linked or held captive there with, as will be described below with respect to assembly embodiments of the invention. Unlike the prior art, however, the threaded screws comprise an intelligently located reduced diameter portion or non-threaded portion formed to not rotationally engage nor interfere with the collet body threaded portion (hereinafter a "free spin zone"). The free spin zone is axially bounded by threads extending towards the proximal end of the screw, and preferably towards the distal end, although such constitution is not necessary to the functionality of the invention or embodiments thereof; it is only necessary to have the free spin zone adjacent to the proximal extending threads so that the threads may decouple from those of the collet body. Additionally, the free spin zone is also preferably outside the housing, thereby maximizing collet body travel and minimizing the axial length of the housing, although such location is not necessary to the operation of the invention or embodiments thereof.

If the free spin zone is not bounded on both sides by the threaded portion, then the threaded portion has one end presenting to the proximal end of the screw and another end presenting to the distal end of the screw. If the free spin zone is bounded on both sides by the threaded portion, then the threaded portion is said to have a proximal threaded segment extending from the free spin zone to the proximal end of the screw and a distal threaded segment extending from the free spin zone to the distal end of the screw. Each described segment also comprises proximal and distal presenting ends.

When a threaded screw includes a distal threaded segment and when such threaded segment is sized to threadably engage with the collet body threads, two advantages are realized: a first advantage allows for threadable insertion of the screw into the proximal end of the collet body, which as will be seen below significantly simplifies creation of assembly embodiments of the invention. A second advantage is realized during manufacture of such screw embodiments—a suitably threaded screw need only be modified to have a free spin zone such as by turning or grinding; no other processes are needed. However, the distal portion of the screw may also comprise a bushing or other equivalent structure as a full or partial replacement of the distal threaded segment (e.g., a portion or zone having generally the same outside diameter as the threaded portion), or may comprise an extension of the reduced diameter portion (threaded or smooth) without departing from the character of the invention embodiments. The skilled practitioner will appreciate, however, that in embodiments wherein the distal portion of the screw has a diameter less than the proximal portion thereof, modifications to the distal ends of the collet body fingers may be needed to maintain appropriate radial expansion characteristics.

The preferred locations of the free spin zone can be ascertained by considering various parameters. To better appreciate these parameters, the following definitions will be used herein. As previously recited, each collet body has a distal end, a proximal end and a threaded portion. The threaded portion also has an axial length. As used herein, the collet body distal end is referenced as CEd, the collet body proximal end is referenced as CEp, and the collet body threaded portion presenting to the distal and proximal ends thereof are referenced as CTd and CTp, respectively, while the axial length of the collet body threaded portion is referenced as CTl.

Each threaded screw comprises analogous portions. As used herein, the threaded screw distal end is referenced as SEd, the threaded screw proximal end is referenced as SEp, and the non-threaded portion of the threaded screw (free-spin zone) presenting to the distal and proximal ends thereof are referenced as SFd and SFp, respectively, while the axial length of the free-spin zone is referenced as SFl. With respect to threaded portions or segments of the screw, each has a distally presenting end STd and a proximally presenting end STp as well as an axial length STl.

The intended function of the free-spin zone as described earlier preferably occurs when the CEd is at a maximum distance from the distal end of the housing, and when the collet body fingers are not being biased radially outwardly. Thus, in this configuration, the collet body threads are generally congruent with the free spin zone (i.e., the collet body threads occupy the reduced diameter annulus that comprises the free spin zone). Engagement of the proximal threaded segment STd end with the CTp will therefore occur when there is compressive contact between the threads in coupling rotation, e.g., clockwise rotation. Conversely, engagement will not occur, even with compressive contact, if the rotation is counter to the coupling direction, e.g., counterclockwise rotation. In preferred embodiments, rotational coupling may be optimized to occur just prior to the distal end of the threaded screw establishing a radial outward bias to the collet body fingers, although such functionality is not necessary to the operation of the various invention embodiments.

In addition to the foregoing, many fastener embodiments are characterized as assemblies. Assembly embodiments of the invention are characterized as retaining the components of the fastener together, namely, the collet body, the threaded screw and the housing. While many modes may be employed to retain these components as an assembly, the most common comprise a collet body having one part of a translation arresting means that cooperates with the housing (which has the other part of the collet body translation arresting means) to prevent unintended escape of the collet body in the distal direction there from, and a captive screw.

Insofar as a screw in the basic sense can bi-directionally translate through the collet body, screws according to these assembly embodiments of the invention comprise a proximally located head portion having an outer diameter greater than the inner diameter of the collet body threaded portion. This prevents the screw from fully translating past the threaded portion of the collet body in the distal direction or stated alternatively, prevents the collet body from fully translating past the threaded portion of the screw in the proximal direction. Alternative and/or additional translation arresting functionality can be achieved by limiting the translation of the threaded screw in the housing, which beneficially isolates screw-collet body translation to movement of the collet body. Thus, the head portion can function as one part of a screw translation arresting means that cooperates with the housing (which has the other part of the screw translation arresting means), preferably in both the distal and proximal directions. In this regard, the screw is held captive within the housing, such as by a shoulder portion of the housing at the proximal end thereof when the screw is urged in the distal direction, and a removable retaining ring when urged in the proximal direction. Use of a removable retaining ring (or more generally a retaining member or retaining means) allows introduction and removal of the collet body and threaded screw into and from the housing via the proximal end of the housing, either as an assembly or sequentially, although removability of these components is not a necessary consideration for the invention). As a consequence of this arrangement, the housing preferably cooperatively prevents over translation of the collet body in the distal direction while the screw head prevents over translation of the collet body in the proximal direction, and the housing preferably cooperatively prevents over translation of the screw head in both the distal and proximal directions.

Creation of such assembly embodiments can be facilitated through the use of an after assembly retainer element that functions as a housing part of the screw translation arresting means (proximal direction). The assembly can be created by inserting the distal end of the collet body into the proximal end of the housing where after a threaded distal end of the threaded screw may be threadably engaged therewith, or such engagement can be accomplished outside the housing, and the assembled components can them be introduced into the housing. In either case, a ring, collar, or other shoulder creating retainer element can be permanently or removably associated with the housing in order to prevent the screw from unintended disassociation from the housing body. It should be noted that tool interface adapter can also function as the assembly retainer element: in such embodiments, the element comprises a first drive element on one side thereof, which interfaces with the threaded screw (the interface adapter may augment or may replace the head portion of the screw, depending upon the embodiment), and a second drive element, which interfaces with an external tool intended to impart rotation to the fastener assembly.

In many of these assembly embodiments, the screw translation arresting means includes a thrust zone to permit axial movement of the screw relative to the housing between proximal and distal translation arrest limits (e.g., screw head portion, and proximal and distal translation arresting means). By incorporating this axial play, disengagement between collet body threads and screw threads can be established and assured, and determination of such disengagement can be easily ascertained (for example, shaking of the assembly provides a clearly audible clicking sound as the screw head portion translates within the thrust zone, continued decoupling rotation of the assembly in combination with a compressive bias creates an audible clicking sound as the paired threads ride on each other, and/or the screw head portion is visible closer to the housing proximal end).

It should be appreciated that the location of the free spin zone on the threaded screw and the relative position of the thrust zone with respect to the screw (as well as its axial displacement) are related as well as constrained. In particular, the maximum axial distance between the collet body CTp and the engageable threaded screw STd when the collet body is at its maximum permitted extended position must be less than the effective axial distance between the housing's proximal and distal translation arresting means (the screw travel distance regarding axial play). This ensures both decoupling and recoupling of the respective threads.

For purposes of this patent, the terms "area", "boundary", "part", "portion", "surface", "zone", and their synonyms, equivalents and plural forms, as may be used herein and by way of example, are intended to provide descriptive references or landmarks with respect to the article and/or process being described. These and similar or equivalent terms are not intended, nor should be inferred, to delimit or define per se elements of the referenced article and/or process, unless specifically stated as such or facially clear from the several drawings and/or the context in which the term(s) is/are used.

BRIEF DESCRIPTION OF THE FIGURES

FIG. 1 is an exploded perspective view of a fastener assembly according to a first embodiment of the invention, particularly illustrating a collet body (in partial cutaway), a housing body, a threaded screw and a retaining ring;

FIG. 1A is an enlarged view of the collet body shown in FIG. 1;

FIG. 2 is a plan elevation view with a partial cut-away of the collet body shown in FIG. 1, particularly illustrating the sectional profile of a collet body leg thereof;

FIG. 3 is a perspective view of the fastener assembly of FIG. 1 shown in an extended or nominal state wherein the threaded screw is wholly within the collet body and housing of the fastener;

FIG. 4 is a perspective view of the fastener assembly of FIG. 1 shown in a retracted or clamped state wherein the collet body has been translatably retracted into the housing and the threaded screw has radially displaced the collet body fingers;

DETAILED DESCRIPTION

Figure 5:
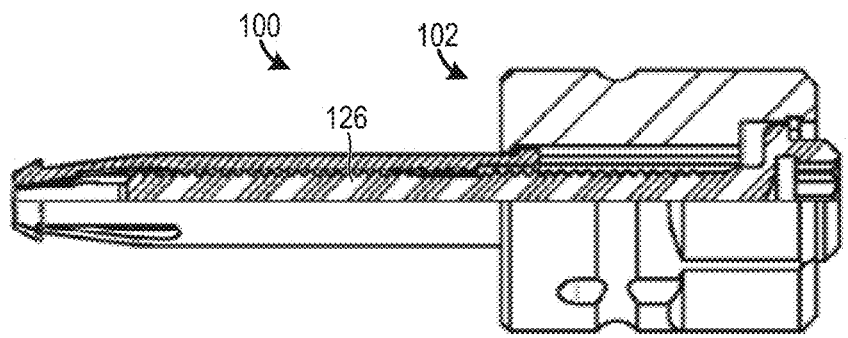
FIG. 5 is a side elevation view in partial section of the fastener assembly of FIG. 1, particularly illustrating a free-spin state wherein the collet body threads are not engaged with the threaded screw, and the relative location of the threaded screw proximal end within the housing of the fastener.
Figure 6:
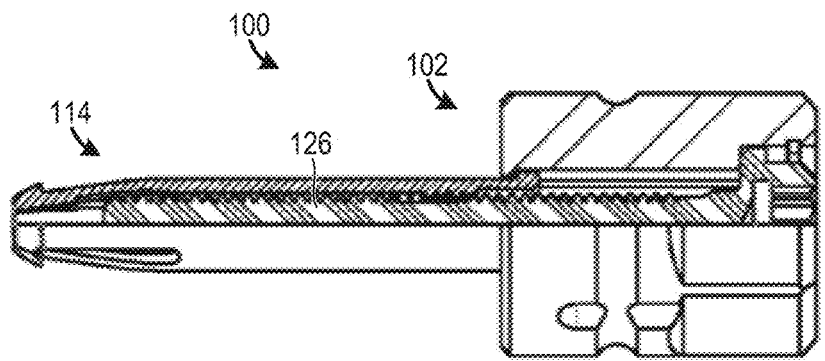
FIG. 6 shows the embodiment of FIG. 4 subsequent to an initial axial bias applied to the threaded screw from the proximal end thereof whereby the screw threads engage with the collet body threads.
Figure 7:
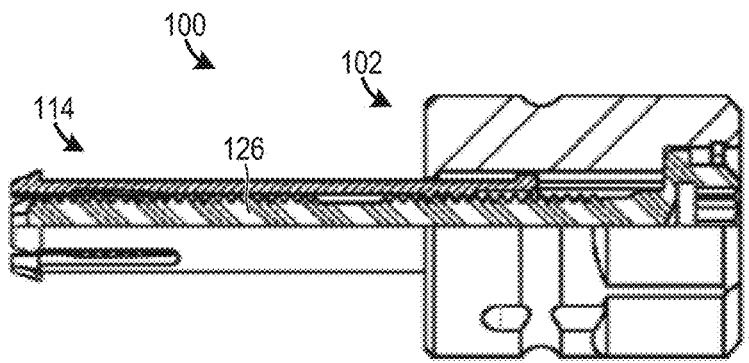
FIG. 7 shows the embodiment of FIG. 6 subsequent to an initial threaded screw rotation wherein the collet body has partially translated towards maximum retraction and the collet body fingers have just been fully radially expanded.
Figure 8:
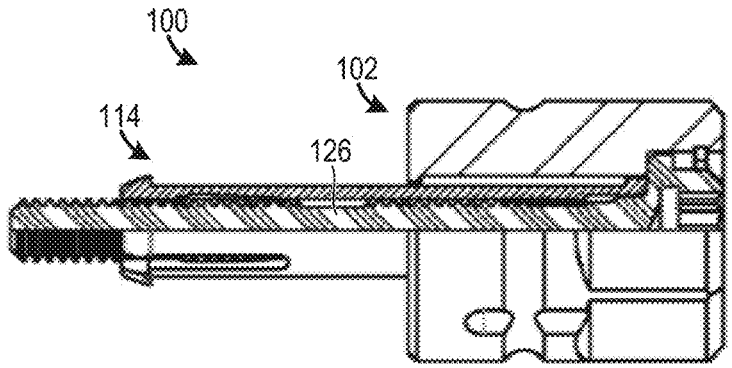
FIG. 8 shows the embodiment of FIG. 9 wherein the collet body has translated to maximum retraction.

FIGS. 1-10 are correspondingly described herein with common reference numerals. A single sided fastener 100 is described herein. The single sided fastener includes an auxiliary structure 102 including a housing 104, a proximal orifice 106 positioned within the housing 104 adjacent to a proximal end 108 of the auxiliary structure 102, and an axially aligned bore 110 positioned within the housing 104. The axially aligned bore 110 includes a first anti-rotation section 112 having a non-circular cross section.

The single sided fastener 100 also includes a collet body 114 including a threaded portion 116 and a second anti-rotation section 118 mating with the first-anti-rotation section 112 to prevent rotation between the collet body and the auxiliary structure 102 while allowing axial translation between the collet body and the auxiliary structure. Furthermore, the second anti-rotation section 118 has a non-circular cross-section. Additionally, the collet body 114 includes a plurality of radially displaceable fingers 120 with a plurality of workpiece gripping elements 122 in exterior surfaces 124 of the plurality of radially displaceable fingers.

The single sided fastener 100 also includes a screw 126 captively retained in the auxiliary structure 102 and in a first configuration rotationally engaging with the threaded portion 116 of the collet body 114 to transform rotational movement thereof into axial translation of the collet body. The screw 126 includes a screw head 128 with a drive tool interface 130 receiving a rotary force imparted by a drive tool 131. The screw 126 also includes a screw head flange 132 positioned in the proximal orifice 106 of the auxiliary structure 102. The screw 126 additionally includes a non-threaded portion 134 axially positioned between a distal threaded portion 136 of the screw and a proximal threaded portion 138 of the screw. Furthermore, when the screw 126 is in a second configuration the non-threaded portion 134 is aligned with the threaded portion 116 of the collet body 114 the screw 126 freely spins within the collet body. Additionally, axial translation of the screw 126 initiates interaction between the plurality of radially displaceable fingers 120 and the distal threaded portion 136 of the screw.

The single sided fastener 100 also includes a retaining ring 140 positioned in the auxiliary structure 102 axially retaining the screw head flange 132.

In one example, in the single sided fastener 100, the non-threaded portion 134 of the screw 126 may have a smaller diameter than a diameter of the distal threaded portion 136 of the screw 126.

In another example, in the single sided fastener 100, the collet body 114 may be captively retained in the auxiliary structure 102.

In another example, in the single sided fastener 100, the auxiliary structure 102 may include a tool interface 142 including facets 144 designed to receive a tool 146. Specifically, FIG. 2 depicts the tool 146, which is designed to rotationally interact with the tool interface 142.

In another example, in the single sided fastener 100 the auxiliary structure 102 may include an exterior work piece contacting surface 148 positioned below the tool interface 142.

In another example, in the single sided fastener 100 the first anti-rotation section 112 and the second anti-rotation section 118 may include corresponding planar surfaces 150.

In another example, in the single sided fastener 100 the first anti-rotation section 112 and the second anti-rotation section 118 may have hexagonal shapes.

In yet another example, in the single sided fastener 100 the distal threaded portion 136 of the screw 126 and the proximal threaded portion 138 of the screw 126 may have equivalent diameters.

In another example, in the single sided fastener 100 the distal threaded portion 136 of the screw 126 extends to an end 152 of the screw 126.

In a further example, the single sided fastener 100 when the non-threaded portion 134 of the screw 126 is aligned with the threaded portion 116 of the collet body 114 the distal threaded portion 136 of the screw 126 may not interact with the plurality of radially displaceable fingers 120.

Figure 9:
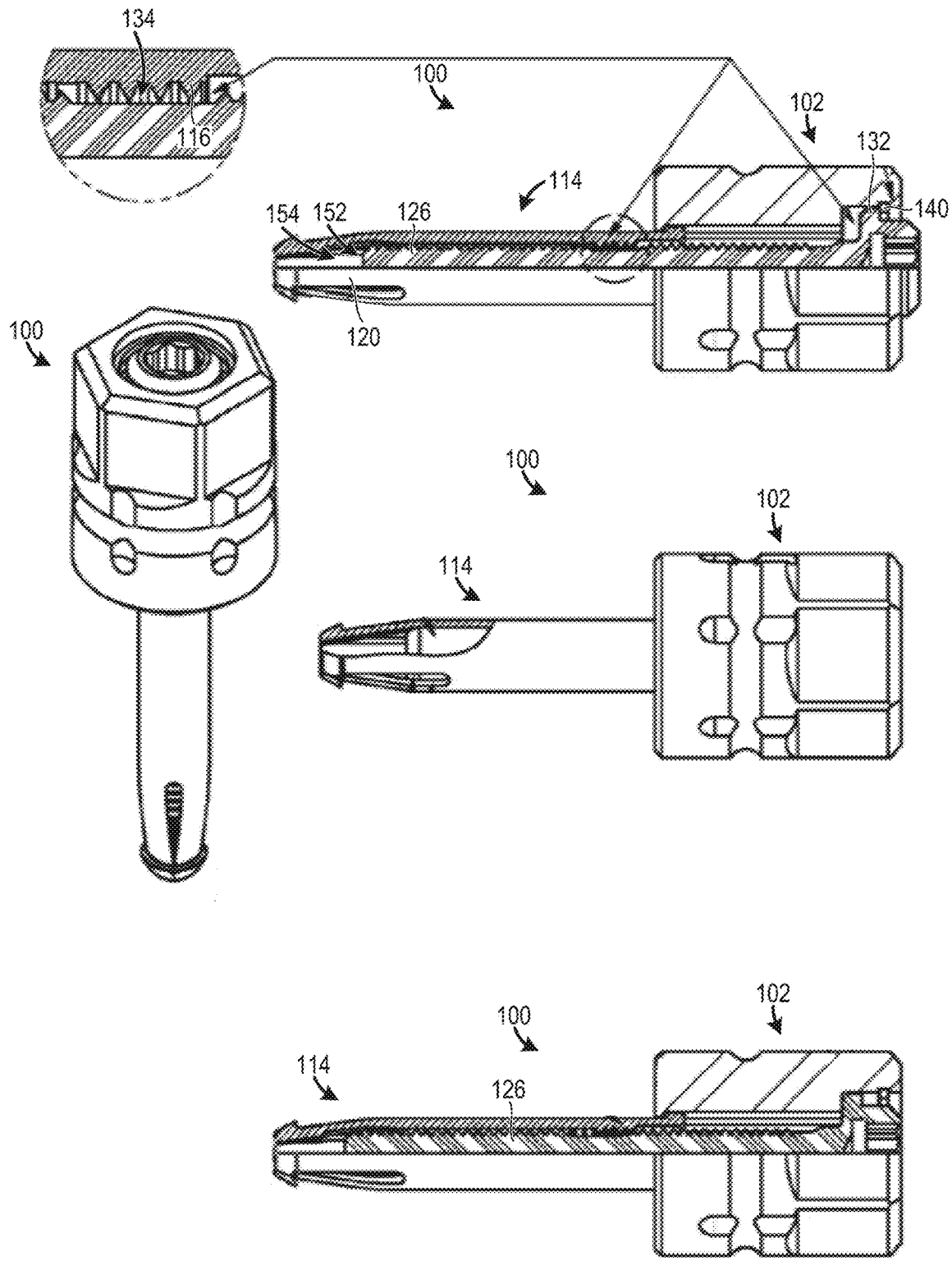
FIG. 9 is a composite illustration describing in images and words the states of the fastener assembly of FIGS. 5 and 6 (and an alternative embodiment)

In FIG. 9, a locking mechanism (i.e., the retaining ring 140) cooperates with a shoulder (e.g., flange 132) on the screw 126 to allow limited axial translation in the reverse direction. This creates the gap in the reverse direction. In reverse, the gap is sized and timed to work with a cooperating thread void (i.e., the non-threaded portion 134) in the screw 126 to create a situation in which reverse torque only causes the screw to spin. No axial translation or force is permitted in this position in the reverse direction. The end 152 of the screw 126 may reside inside of an undercut (i.e., pocket 154) in the legs (i.e., the radially displaceable fingers 120). The pocket may be created via several options. In a first option, the legs may be contoured in thickness and may be machined, formed, cast, drawn, etc. In a second option, the legs may have a constant thickness but a pocket is still created through the bending process of the legs.

Additionally, as shown in FIG. 9, the pocket 154 may be defined by having a bushing (e.g., screw elements—center pin) protruding past the slot ends. Additionally, the screw head flange 132 may be seated against the auxiliary structure 102. A gap again exists for next reversal of torque to activate free spin. The collet body 114 may be held in place by anti-rotation means and collet body axial arresting means (during application pressure as noted). Furthermore, a slight axial pressure (head end toward pocket end) combined with forward torque will cause the threads on the collet body 114 and screw 126 to cooperate and reengage.

Figure 10:
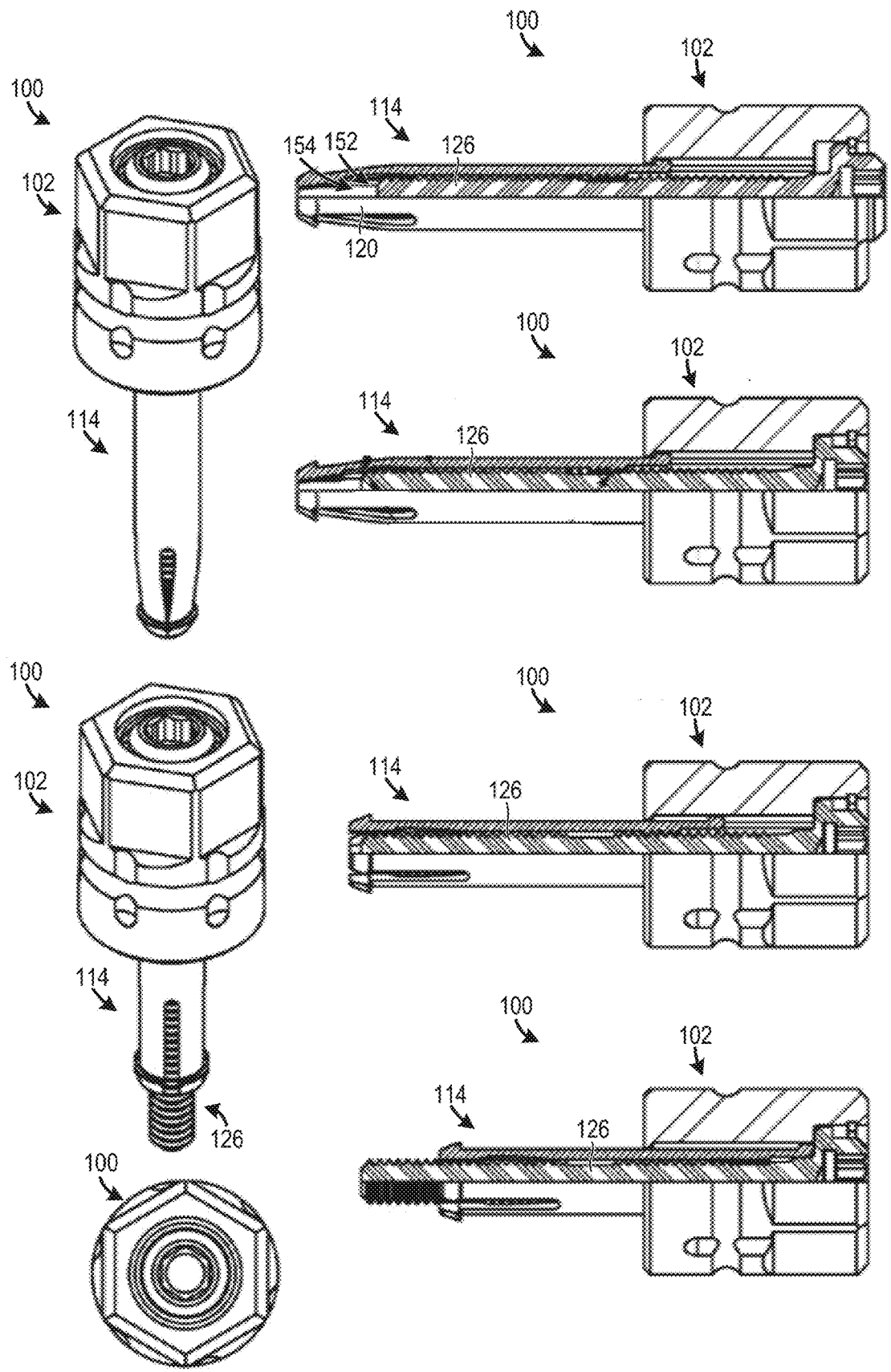
FIG. 10 is a composite illustration describing in images and words the states of the fastener assembly of FIGS. 7 and 8.

In FIG. 10, the screw 126 resides inside of the pocket 154. Additionally in FIG. 10, free spin of the screw 126 may work best if the end 152 of the screw is not trying to open the radially displaceable fingers 120 prior to having a thread or two engage.

The invention claimed is:
1. A fastener, comprising:
   a housing including:
      a plurality of facets designed to receive an external tool;
      a proximal orifice positioned within the housing adjacent to a proximal end of the housing;
      an axially aligned bore positioned within the housing, wherein the axially aligned bore includes a first hexagonal section, wherein the proximal orifice has a greater inner diameter than the axially aligned bore and includes a seat at a lower end; and
      a planar work piece contacting surface at a distal end of the housing;
   a removable retaining ring positioned in the proximal orifice;
   a collet body including:
      a threaded portion;
      a second hexagonal section mating with the first hexagonal section; and
      a plurality of radially displaceable fingers with a plurality of work piece gripping elements on an exterior of the plurality of radially displaceable fingers; and
   a screw including:
      a threaded portion;
      a screw head with a drive tool interface and a flange that extends radially outward and includes an upper surface and a lower surface, wherein the flange is positioned in the proximal orifice; and
      an unthreaded portion axially positioned below the threaded portion of the screw;
   wherein, in a first configuration, the threaded portion of the screw rotationally engages with the threaded portion of the collet body and a distal portion of the screw radially expands the plurality of radially displaceable fingers;
   wherein, in a second configuration, the distal portion of the screw is positioned in a pocket between the plurality of radially displaceable fingers, the plurality of radially displaceable fingers are not biased radially outward by the distal portion of the screw, the unthreaded portion of the screw is aligned with the threaded portion of the collet body, and the threaded portion of the screw is disengaged from the threaded portion of the collet body;
   wherein, in the first and second configurations, the second hexagonal section of the collet body remains axially between the proximal orifice and the planar work piece contacting surface;
   wherein, in the first and second configurations, the upper and lower surfaces of the flange remain axially between the removable retaining ring and the seat in the proximal orifice; and
   wherein the unthreaded portion of the screw has a round cross-sectional profile.

2. The fastener of claim 1, wherein the pocket is formed via contoured thicknesses of the plurality of radially displaceable fingers.

3. The fastener of claim 1, wherein the pocket is formed via bends in the plurality of radially displaceable fingers.

4. The fastener of claim 1, wherein rotation of the screw in a first direction transitions the collet body into the first configuration and wherein rotation of the screw in a second direction opposite the first direction transitions the fastener into the second configuration.

5. The fastener of claim 1, wherein the screw is captively retained in the housing on a first axial side via a removable retaining ring and wherein, in the first configuration, the removable retaining ring is axially spaced away from a flange of the screw head.

6. The fastener of claim 5, wherein the screw is captively retained in the housing on a second axial side via the seat in the housing.

7. The fastener of claim 6, wherein the removable retaining ring and the seat in the housing axially retain the flange of the screw head.

8. The fastener of claim 1, wherein the unthreaded portion is spaced away from a distal end of the screw.

9. The fastener of claim 1, wherein the unthreaded portion is positioned outside the housing.

10. The fastener of claim 1, wherein the plurality of facets has a hexagonal arrangement.

11. The fastener of claim 1, wherein the plurality of facets is spaced away from the planar work piece contacting surface in the housing.

12. The fastener of claim 1, wherein, in the second configuration, the plurality of radially displaceable fingers bend inward.

13. A single sided fastener, comprising:
a housing including:
a proximal orifice positioned within the housing adjacent to a proximal end of the housing; and
an axially aligned bore positioned within the housing, where the axially aligned bore includes a first anti-rotation section having one or more planar surfaces, wherein the axially aligned bore has a smaller inner diameter than an inner diameter of the proximal orifice;
a collet body including:
a threaded portion;
a second anti-rotation section mating with the first anti-rotation section; and
a plurality of radially displaceable fingers with a plurality of work piece gripping elements on an exterior of the plurality of radially displaceable fingers;
a screw including:
a threaded portion;
a screw head with a drive tool interface;
a reduced diameter portion axially positioned below the threaded portion of the screw; and
a distal portion axially positioned below the reduced diameter portion, wherein the distal portion and the threaded portion have a similar outer diameter; and
a removable retaining ring positioned in the proximal orifice above a flange of the screw head;
wherein, in a first configuration, the threaded portion of the screw rotationally engages with the threaded portion of the collet body and the distal portion of the screw radially expands the plurality of radially displaceable fingers;
wherein, in a second configuration, the distal portion of the screw is positioned in a pocket between the plurality of radially displaceable fingers, the reduced diameter portion of the screw is aligned with the threaded portion of the collet body, the plurality of radially displaceable fingers are not biased radially outward by the distal portion of the screw, the threaded portion of the screw is disengaged from the threaded portion of the collet body, and the screw freely spins within the collet body;
wherein, in the second configuration, an axial gap is formed between the flange of the screw head and a lower surface of the proximal orifice that extends radially inward;
wherein, in the first configuration, an axial gap is formed between the removable retaining ring and the flange of the screw head; and wherein the reduced diameter portion of the screw has a round cross-sectional profile.

14. The single sided fastener of claim 13, wherein the reduced diameter portion of the screw is unthreaded and is spaced away from a distal end of the screw.

15. The single sided fastener of claim 14, wherein the single sided fastener transitions between the first configuration and the second configuration responsive to rotation of the screw in opposite rotational directions.

16. The single sided fastener of claim 13, wherein the pocket is formed via a contoured thickness of the plurality of radially displaceable fingers or via a bend in the plurality of radially displaceable fingers.

17. A single sided fastener, comprising:
a housing including:
a proximal orifice positioned within the housing adjacent to a proximal end of the housing and including a seat at a distal end;
an axially aligned bore positioned within the housing, wherein the axially aligned bore includes a first hexagonal section, wherein the axially aligned bore is positioned below the proximal orifice and has a smaller inner diameter that an inner diameter of the proximal orifice; and
a planar work piece contacting surface at a distal end of the housing;
a collet body including:
a threaded portion;
a second hexagonal section mating with the first hexagonal section; and
a plurality of radially displaceable fingers with a plurality of work piece gripping elements on an exterior of the plurality of radially displaceable fingers;
a screw including:
a threaded portion;
a screw head with a drive tool interface and a flange that includes an upper surface, a lower surface, and a circumferential side surface that has an outer diameter that is less than an inner diameter of the proximal orifice and greater than an inner diameter of the axially aligned bore;
a reduced diameter portion positioned below the threaded portion; and
a distal portion position below the reduced diameter portion, wherein the distal portion and the threaded portion have a similar outer diameter; and
a removable retaining ring that captively retains the screw in the housing on a first axial side;
wherein, in a clamped configuration, the threaded portion of the screw rotationally engages with the threaded portion of the collet body and a distal portion of the screw radially expands the plurality of radially displaceable fingers;
wherein, in a free-spin configuration, the distal portion of the screw is positioned in a pocket between the plurality of radially displaceable fingers, the reduced diameter portion of the screw is aligned with the threaded portion of the collet body, the plurality of radially displaceable fingers are not biased radially outward by the distal portion of the screw, the threaded portion of the screw is disengaged from the threaded portion of the collet body, and the screw freely spins within the collet body;
wherein, in the free-spin configuration, an axial gap is formed below the lower surface of the flange and the seat of the proximal orifice;

wherein in the clamped and free-spin configurations, the second hexagonal section of the collet body remains axially between the proximal orifice and the planar work piece contacting surface;

wherein, in the clamped configuration, an axial gap is formed between the removable retaining ring and the upper surface of the flange of the screw head; and wherein the reduced diameter portion of the screw has a round cross-sectional profile.

18. The single sided fastener of claim 17, wherein the housing includes a plurality of facets that is spaced away from the planar work piece contacting surface in the housing.

19. The single sided fastener of claim 17, wherein the pocket is contoured as an undercut and wherein the pocket is formed via a contoured thickness of the plurality of radially displaceable fingers.

20. The single sided fastener of claim 17, wherein the reduced diameter portion of the screw is spaced away from a distal end thereof and the distal portion of the screw is threaded.

\* \* \* \* \*